(12) United States Patent
Factor et al.

(10) Patent No.: US 7,756,110 B2
(45) Date of Patent: Jul. 13, 2010

(54) NETWORK-BASED CONTROL OF AUDIO/VIDEO STREAM PROCESSING

(75) Inventors: Richard C. Factor, Kinnelon, NJ (US); Nicholas Rose, Bloomingdale, NJ (US); Anthony M. Agnello, Princeton, NJ (US)

(73) Assignee: Eventide Inc., Little Ferry, NJ (US)

( * ) Notice: Subject to any disclaimer, the term of this patent is extended or adjusted under 35 U.S.C. 154(b) by 1429 days.

(21) Appl. No.: 11/129,869

(22) Filed: May 16, 2005

(65) Prior Publication Data
US 2005/0254483 A1 Nov. 17, 2005

Related U.S. Application Data

(60) Provisional application No. 60/571,734, filed on May 17, 2004.

(51) Int. Cl.
H04L 12/66 (2006.01)
(52) U.S. Cl. .......................... 370/352; 700/83
(58) Field of Classification Search ......... 370/352–356; 704/251; 700/83
See application file for complete search history.

(56) References Cited

U.S. PATENT DOCUMENTS

| | | | | | |
|---|---|---|---|---|---|
| 4,282,606 | A | * | 8/1981 | Factor | 455/899 |
| 4,520,404 | A | * | 5/1985 | Von Kohorn | 386/54 |
| 5,195,135 | A | * | 3/1993 | Palmer | 380/241 |
| 5,371,795 | A | * | 12/1994 | Vogel | 725/14 |
| 5,751,368 | A | * | 5/1998 | Cooper | 348/512 |
| 6,020,882 | A | * | 2/2000 | Kinghorn et al. | 715/716 |
| 6,181,364 | B1 | * | 1/2001 | Ford | 725/32 |
| 6,317,795 | B1 | | 11/2001 | Malkin et al. | 709/246 |
| 6,351,596 | B1 | | 2/2002 | Ostrover | 386/46 |
| 6,820,144 | B2 | | 11/2004 | Smirnov et al. | 710/52 |
| 6,859,460 | B1 | * | 2/2005 | Chen | 370/412 |

(Continued)

FOREIGN PATENT DOCUMENTS

EP 0 893 920 A2 1/1999

(Continued)

OTHER PUBLICATIONS

"Eventide BD500," NAB 2004, 'Online! Apr. 16, 2004, pp. 1-1, XP002342079.

Primary Examiner—Simon Sing
(74) Attorney, Agent, or Firm—Mendelsohn, Drucker & Associates, P.C.; Kevin M. Drucker; Steve Mendelsohn

(57) ABSTRACT

A method for controlling media stream processing comprises: (a) transmitting a media stream, via a first packet-based network, to an operator; (b) receiving from the operator, via a second packet-based network, a control signal for processing the media stream; (c) processing the media stream based on the control signal; and (d) transmitting the processed media stream to one or more users other than the operator. In another embodiment, an apparatus for controlling media stream processing comprises a server adapted to effect transmission of a media stream, via a first packet-based network, to an operator. The apparatus further comprises a processor adapted (i) to effect processing of the media stream based on a control signal received from the operator via a second packet-based network, and (ii) to provide the processed media stream to a transmitter for transmission to one or more users other than the operator.

37 Claims, 2 Drawing Sheets

U.S. PATENT DOCUMENTS

| | | | |
|---|---|---|---|
| 7,499,993 B2 * | 3/2009 | Seo | 709/224 |
| 2003/0014530 A1 | 1/2003 | Bodin et al. | 709/231 |
| 2003/0078972 A1 * | 4/2003 | Tapissier et al. | 709/204 |
| 2006/0095262 A1 * | 5/2006 | Danieli | 704/251 |
| 2008/0092168 A1 * | 4/2008 | Logan et al. | 725/44 |

FOREIGN PATENT DOCUMENTS

| | | |
|---|---|---|
| EP | 1 202 571 A2 | 5/2002 |

\* cited by examiner

NETWORK-BASED CONTROL OF AUDIO/VIDEO STREAM PROCESSING

CROSS-REFERENCE TO RELATED APPLICATION

This application claims the benefit of the filing date of U.S. provisional application No. 60/571,734, filed on May 17, 2004, the teachings of which are incorporated herein by reference in their entirety.

BACKGROUND OF THE INVENTION

1. Field of the Invention

The present invention relates, generally, to the control of audio and/or video transmission devices, and more particularly, to systems and methods for permitting processing of an audio and/or video stream in substantially real-time during a broadcast transmission thereof.

2. Description of the Related Art

Broadcasting undesirable, objectionable, or offensive audio and/or video material can have significant consequences for broadcasters, ranging from monetary penalties levied by governmental organizations to the alienation of existing and potential audiences and advertisers.

A conventional "profanity delay" device for censoring portions of an audio broadcast delays audio signals and enables an operator to remove (or "dump") an interval of audio signal containing objectionable material from a signal to be broadcast. Audio is fed into the profanity delay in a continuous stream, as the program is being produced, but is buffered so that it does not leave the delay for a pre-designated period of time, thereby allowing a console operator or host to respond to a problem by dumping the offensive material before it airs. "Filler audio," such as a station jingle or ID, a beeping sound, or other audio, can be used to cover the time necessary to build up delay before the program continues. Alternatively and/or additionally, some profanity delay devices use digital signal processing (DSP) to build the required delay slowly over the course of several minutes of programming in a manner undetectable to most listeners.

The profanity delay hardware typically resides in the broadcast facility and is interposed somewhere between the microphone and the transmitter. Accordingly, delay units are typically controlled locally, by a person physically located at the place of broadcast, and do not permit the decision to delete an audio segment to be made remotely by a producer or executive. The necessity for the profanity delay unit operator to be physically present near the equipment is an undesirable constraint. It would be desirable to allow decisions to dump content to be made at and controlled from one or more distant locations, as well as to permit dump decisions to be "distributed" among several physical locations.

SUMMARY OF THE INVENTION

Problems in the prior art are addressed in accordance with the principles of the present invention in its various embodiments.

In one embodiment, the present invention provides a method for controlling media stream processing. The method comprises: (a) transmitting a media stream, via a first packet-based network, to an operator; (b) receiving from the operator, via a second packet-based network, a control signal for processing the media stream; (c) processing the media stream based on the control signal; and (d) transmitting the processed media stream to one or more users other than the operator.

In another embodiment, the present invention provides an apparatus for controlling media stream processing. The apparatus comprises a server adapted to effect transmission of a media stream, via a first packet-based network, to an operator. The apparatus further comprises a processor adapted (i) to effect processing of the media stream based on a control signal received from the operator via a second packet-based network, and (ii) to provide the processed media stream to a transmitter for transmission to one or more users other than the operator.

In a further embodiment, the present invention provides a system for controlling media stream processing. The system comprises means for transmitting a media stream, via a first packet-based network, to an operator; means for effecting processing of the media stream based on a control signal received from the operator via a second packet-based network; and means for providing the processed media stream to a transmitter for transmission to one or more users other than the operator.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
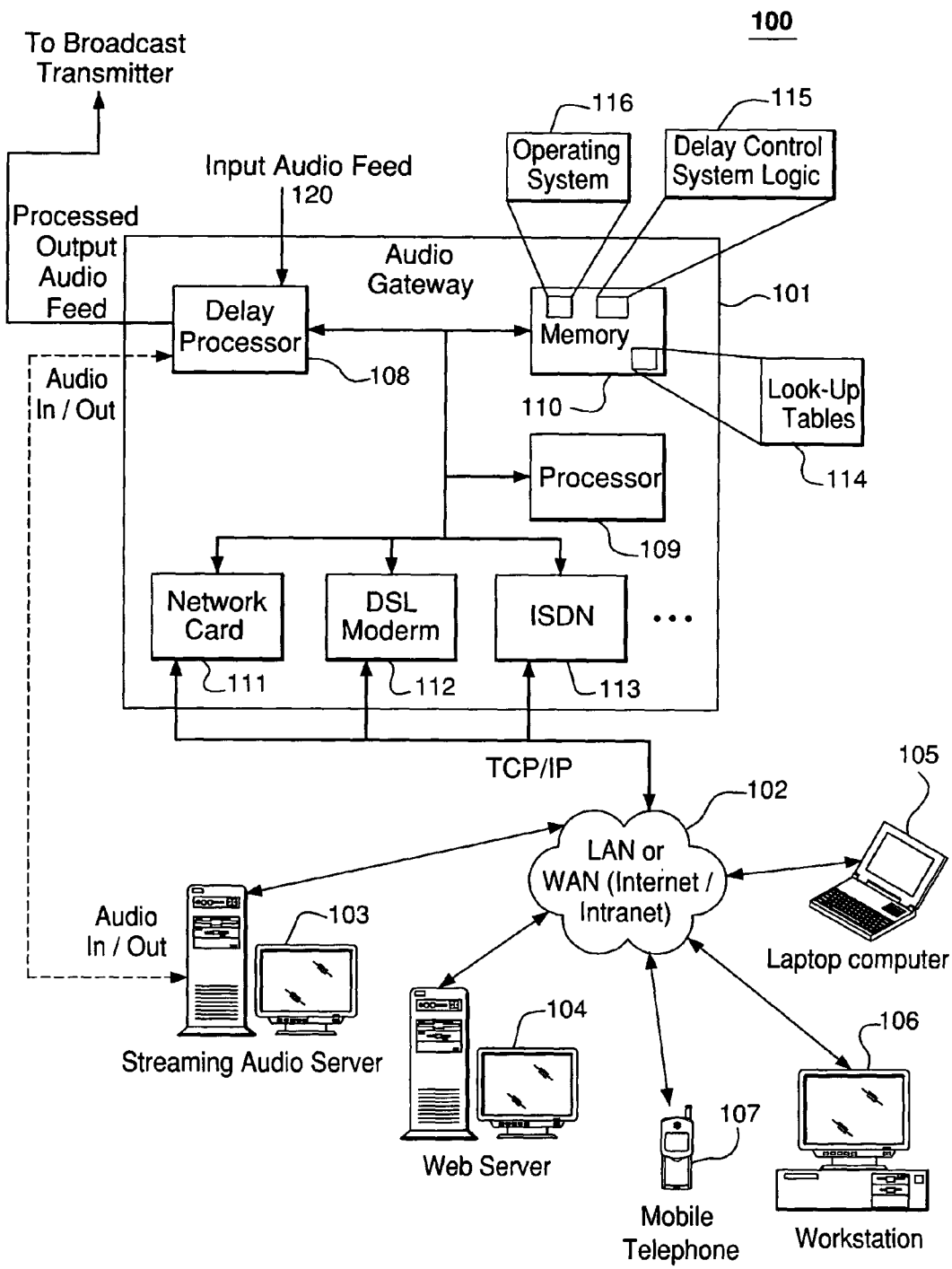
FIG. 1 is a block diagram illustrating a delay control system consistent with one embodiment of the present invention.

With reference now to FIG. 1, a block diagram illustrates an exemplary delay control system 100 consistent with one embodiment of the present invention. As shown, delay control system 100 has an audio gateway 101 coupled via a network 102 (e.g., a LAN, a WAN, a VPN, an intranet, or the Internet) to a streaming audio server 103, a web server 104, and one or more client terminals, e.g., laptop computer 105, workstation 106, and mobile telephone 107. Mobile telephone 107 may be connected to network 102, e.g., via an intermediate telephonic network (not shown).

Audio gateway 101 is configured to receive an analog or digital input audio feed, to analyze and process the input audio feed, and to output the resulting processed analog or digital audio feed. While, in most implementations, the "processing" of the input audio feed refers to the execution of an audio "dump," i.e., the redaction of a short, unwanted segment of audio, it is contemplated that other types of audio processing may take place in a system consistent with the present invention, e.g., the insertion or reordering of audio segments, gain control, reverb control, etc. Audio gateway 101 may also be configured to convert the input and/or output audio feeds into TCP/IP format for transmission via network 102, and may further be configured to provide the processed analog or digital audio feed directly to streaming audio server 103, without passing through network 102. As will be further described below, audio gateway 101 may communicate information, service requests, control signals, etc., across network 102 to and from one or more of streaming audio server 103, web server 104, laptop computer 105, workstation 106, and mobile telephone 107. While shown as receiving a single input audio feed and providing a single output audio feed, audio gateway 101 may receive, process, and/or output multiple audio feeds in other embodiments.

Streaming audio server 103 is configured to receive, via network 102, one or more pre- or post-processed audio feeds from audio gateway 101, and to buffer and transmit the one or more audio feeds to one or more of client terminals 105, 106, 107 via network 102. While streaming audio server 103 and audio gateway 101 are shown as being connected via network 102 and/or by direct connection, streaming audio server 103 may alternatively be physically integrated with audio gateway 101, or otherwise connected more directly to audio gateway 101, to eliminate or reduce the potential for latency in audio transmissions. Accordingly, as shown in broken lines, streaming audio server 103 may further receive one or more audio feeds directly from audio gateway 101 and/or provide one or more audio feeds directly to audio gateway 101.

Web server 104 stores and executes (and/or uploads to client terminals 105, 106, 107) software for permitting client terminals 105, 106, 107 to control audio gateway 101 and may further store and execute (and/or upload to client terminals 105, 106, 107) software for permitting client terminals 105, 106, 107 to receive audio data from streaming audio server 103. In this regard, client terminals 105, 106, 107 can be used to access audio data provided by audio gateway 101 and/or streaming audio server 103 through a standard web browser, e.g., Microsoft Internet Explorer or specialized client software.

The information transmitted and received by the various components of delay control system 100 may be further integrated with other data transmission protocols for transmission across telecommunications and computer networks other than the Internet, e.g., a mobile telephone network. In addition, it should be further appreciated that telecommunications and computer networks other than the Internet can function as a transmission path between the various components of delay control system 100.

In the exemplary embodiment shown, audio gateway 101 contains several physical components, including a delay processor 108, a processor 109, a memory 110, a network card 111, a DSL modem 112, an ISDN card 113, as well as certain other well-known components (not illustrated) that enable a TCP/IP connection to network 102.

Delay processor 108 is configured to receive an input audio feed 120, analyze the input audio feed, and possibly modify the audio feed based on control signals generated at one or more of client terminals 105, 106, 107. Delay processor 108 may be configured to provide the input audio feed and/or the modified, processed audio feed directly to one or more external devices (e.g., a radio broadcast transmitter) and/or system components (e.g., streaming audio server 103, either directly or via network 102). The functionality of delay processor 108 may be embodied in a hardware device, as disclosed, e.g., in U.S. Pat. No. 4,282,606 to Factor, the teachings of which are incorporated herein by reference, or alternatively, may be implemented entirely in software, or in a combination of software and hardware. Audio may be fed into delay processor 108 in a continuous stream, as a program is being produced, and may be buffered so that it does not leave delay processor 108 for a pre-designated period of time, thereby allowing a console operator or host to respond to a problem by dumping the unwanted material before it is sent to a broadcast transmitter. Delay processor 108 may employ filler or other audio to cover the time necessary to build up delay before the program continues. Alternatively or additionally, delay processor 108 may employ digital signal processing (DSP) to build the required delay (e.g., slowly over the course of several minutes of programming) in a relatively undetectable manner.

Memory 110 includes delay control system logic 115, operating system (O/S) 116, and one or more look-up tables 114. Delay control system logic 115 includes program code for controlling the operation of processor 109 and delay processor 108 to carry out various functions that are orchestrated and/or controlled by system logic 115. For example, memory 110 may include program code for controlling the operation of processor 109 to evaluate incoming control signals generated at client terminals 105, 106, 107 (and possibly the contents of the input audio feed received at delay processor 108, as well), to determine how delay processor 108 should modify the input audio feed to comply with the control signals. In this regard, look-up tables 114 may be used to assist in interpreting and/or disambiguating one or more control signals generated at client terminals 105, 106, 107. These control signals may correspond to various audio processing functions, such as performing "dumps" of varying lengths, e.g., a 5-second dump, a 10-second dump, inserting one or more audio segments, etc. In an implementation that includes the processing of both audio and video streams, such instructions might include, e.g., dump video only (or insert blur, fuzzball, or other device), dump audio only, dump both audio and video, etc.

Audio gateway 101 may also include one or more mechanisms for communicating with remote systems. For example, network card 111 would allow audio gateway 101 to communicate across a local area network to a network server (not shown), which in turn may contain a backup gateway (not shown) to network 102. Alternatively or additionally, DSL modem 112 may be configured to provide a direct dial link to a remote system (not shown), by way of a public-switched telephone network. Alternatively or additionally ISDN card 113 is configured to communicate via an ISDN connection with a remote system (not shown). Other communication gateways (not shown) may be provided, as well, to serve as primary and/or backup links to network 102 or to local area networks that might serve to permit local monitoring of gateway health and data packet control.

The logic of audio gateway 101 may be implemented in hardware, software, firmware, or a combination thereof. In the currently contemplated best mode, the audio gateway system logic is implemented in software, as an executable program, and is executed by a special or general purpose digital computer, such as a personal computer (IBM-compatible, Apple-compatible, or otherwise), workstation, minicomputer, or mainframe computer. While, in the preferred embodiment, delay control system logic 115 resides within audio gateway 101, embodiments are contemplated wherein system logic 115 resides, in whole or in part, within memory remote from audio gateway 101, such as memory present in web server 104, streaming audio server 103, or one or more of client terminals 105, 106, 107.

Processor 109 is a hardware device for executing software, particularly that stored in memory 110. Processor 109 can be any custom-made or commercially-available processor or central processing unit, an auxiliary processor among several processors associated with audio gateway 101, a semiconductor-based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

Memory 110 can include any one or combination of volatile memory elements, e.g., random access memory (RAM, such as DRAM, SRAM, SDRAM, etc.) and nonvolatile memory elements, e.g., ROM, hard drive, tape, CDROM, etc. Moreover, memory 110 may incorporate electronic, magnetic, optical, and/or other types of storage media. Memory 110 may have a distributed architecture, wherein various components are situated remotely from one another, but can still be accessed by processor 109. Memory 110 may also store one or more look-up tables 114 to effect various functionality.

The software in memory 110 may include one or more separate programs, each of which comprises an ordered listing of executable instructions for implementing logical functions. In the example of FIG. 1, the software in memory 110 includes delay control system logic 115 in accordance with the present invention and a suitable operating system 116. A nonexhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). Operating system 116 essentially controls the execution of other computer programs, such as delay control system logic 115, and provides scheduling, input-output control, file and data management, memory management, and communication control and related services. In certain alternative embodiments, a formal operating system might not be employed, e.g., wherein the processor is a digital signal processor (DSP) running appropriate scheduling software.

Delay control system logic 115 may be a source program, executable program (object code), script, or any other entity comprising a set of instructions to be performed. If delay control system logic 115 is a source program, then the program may be translated via a compiler, assembler, interpreter, or the like, which may or may not be included within memory 110, so as to operate properly in connection with the O/S 116. Furthermore, delay control system logic 115 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

While not shown in FIG. 1, audio gateway 101 may include one or more input and/or output (I/O) devices or peripherals that are communicatively coupled via one or more local interfaces, e.g., buses or other wired or wireless connections. Such I/O devices may include input devices, e.g., a keyboard, mouse, scanner, microphone, etc. Such I/O devices may also include output devices, e.g., a printer, display, etc. Such I/O devices may further include devices that communicate both inputs and outputs, e.g., a modem for accessing another device, system, or network, a radio frequency (RF) or other transceiver, a telephonic interface, a bridge, a router, etc.

Audio gateway 101 may include additional elements, which are omitted for simplicity, such as controllers, buffers (caches), drivers, repeaters, and receivers, to enable communications. Further, audio gateway 101 may include address, control, and/or data connections to enable appropriate communications among the aforementioned components. If audio gateway 101 is implemented as a PC, workstation, or the like, the software in memory 110 may further include a basic input output system (BIOS), i.e., a set of software routines that initialize and test hardware at startup, start O/S 116, and support the transfer of data among the hardware devices. The BIOS is stored in ROM so that the BIOS can be executed when audio gateway 101 is powered on.

When audio gateway 101 is in operation, processor 109 is configured to execute software stored within memory 110, to communicate data to and from memory 110, and generally to control operations of audio gateway 101 pursuant to the software. Delay control system logic 115 and O/S 116, in whole or in part, but typically the latter, are read by processor 109, possibly buffered within processor 109, and then executed.

When delay control system logic 115 is implemented in software, it should be noted that delay control system logic 115 can be stored on and/or embodied in any computer-readable medium for use by or in connection with any computer-related system or method, e.g., an instruction execution system, apparatus, or device, such as a computer-based system, processor-containing system, or other system that can fetch the instructions from the instruction execution system, apparatus, or device and execute the instructions.

A computer-readable medium can be any means that can store, communicate, propagate, or transport a program for use by or in connection with the instruction execution system, apparatus, or device. The computer-readable medium can be, e.g., an electronic, magnetic, optical, electromagnetic, infrared, or semiconductor system, apparatus, device, or propagation medium. More specific examples of the computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CD-ROM) (optical). The computer-readable medium could even be paper or another suitable medium upon which the program is printed, since the program can be electronically captured, via for instance optical scanning of the paper or other medium, then compiled, interpreted or otherwise processed in a suitable manner if necessary, and then stored in a computer memory.

In an alternative embodiment, wherein delay control system logic 115 is implemented in hardware, delay control system logic 115 can be implemented with one or more of the following technologies or their equivalents: one or more discrete logic circuit(s) having logic gates for implementing logic functions upon data signals, an application-specific integrated circuit (ASIC) having appropriate combinational logic gates, a programmable gate array(s) (PGA), a field-programmable gate array (FPGA), etc.

It should be understood that the foregoing described architecture for delay control system 100 and its various components is merely exemplary, and that other hardware and/or software configurations may be employed in a delay control system consistent with the invention.

Figure 2:
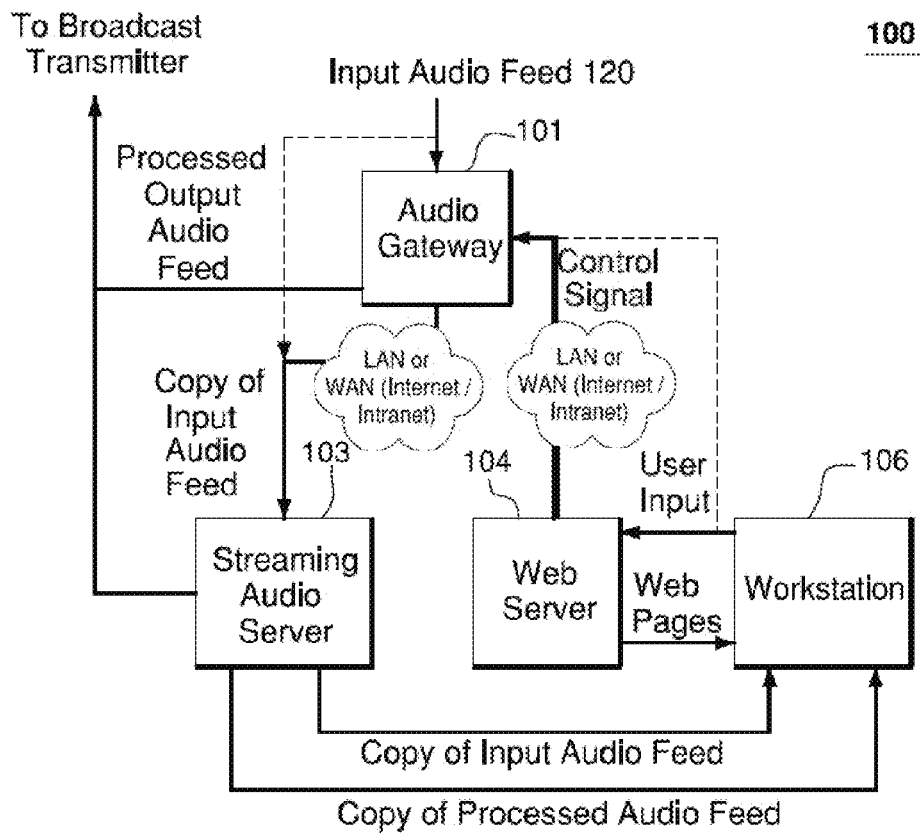
FIG. 2 is a block diagram illustrating the exchange of signals and data in an exemplary method of delay control consistent with one embodiment of the present invention.

Having described the control system of FIG. 1, reference is now made to FIG. 2, a block diagram illustrating the exchange of signals and data between the various components of delay control system 100. As shown, audio gateway 101 receives input audio feed 120, i.e., an audio stream that is to be monitored for unwanted content. This audio feed is also provided, via a first packet-based network, to streaming audio server 103 (either through audio gateway 101 or directly from the input audio source), and streaming audio server streams the audio feed to workstation 106, so that a person working at workstation 106 can monitor the audio feed for unwanted content via a standard web browser.

Web server 104 provides one or more web pages (e.g., HTML) employing suitable controls (e.g., a form containing "buttons") for an operator working at workstation 106 to provide a dump control signal (e.g., by means of a "dump" button) and/or other control signals for controlling the processing of the input audio feed by audio gateway 101. Such control signals may be sent, via a second packet-based network, to audio gateway 101 via web server 104, e.g., via an HTTP message, or alternatively, directly to audio gateway 101. It is noted that the first packet-based network and the second packet-based network can be different networks or can be the same network.

Audio gateway 101 receives the control signals, modifies the input audio feed accordingly (e.g., by removing a segment of "dumped" audio), and outputs a processed audio feed, e.g., to a broadcast transmitter (not shown). The processed audio feed may alternatively or additionally be provided to streaming audio server 103 (and/or additional streaming audio servers), in the event the broadcast destination is a "webcast" or "netcast" for broadcast via the Internet or other network. Accordingly, the term "broadcast transmitter," as used herein, should be understood to include traditional television and radio broadcast transmitters, satellite and cable television and radio transmitters, hardware and software for effecting streaming audio and video across a computer network to a plurality of users, such as a content server, and any other device or combination of devices for effecting the transmission of a stream of audio and/or video content to a plurality of listeners and/or viewers.

The processed output audio feed may also be provided to streaming audio server 103 (or a different streaming audio server), which streams the processed output audio feed to the operator at workstation 106, thereby permitting the operator to monitor the processed feed that will actually be broadcast to listeners. A control may be provided on the one or more web pages provided by web server 104 to permit the operator at workstation 106 to select whether to listen to the input audio feed or the processed output audio feed. The processed output audio feed may simply consist of a delayed version of the input audio feed, if no dumps or other processing have been effected by the operator at workstation 106.

For security, the dump and/or other control signals for processing the input audio feed may be sent as one or more encrypted messages (e.g., using secure HTTP) to audio gateway 101, either via web server 104 or directly to audio gateway 101. Moreover, a virtual private network (VPN) tunnel may be provided between one or more components of delay control system 100, e.g., between audio gateway 101 and workstation 106, to prevent unauthorized monitoring of the audio feed(s) and/or control signals being provided to audio gateway 101.

An additional security measure that may be employed is a rights management scheme to control the rights of certain users to perform various functions, e.g., monitoring one or more of the input/output audio streams and effecting dumps.

Other operator controls that may be provided for an operator to control the processing of the input audio stream include, e.g., segmented delay or partial dump functions, and appropriate control information for effecting these functions can be returned to web server 104 and/or audio gateway 101.

The foregoing functionality permits an operator to enable and control profanity delay functionality remotely, from anywhere with network (e.g., Internet) access, via a standard browser. Moreover, because such controls are provided via a communications network, it is possible to enable a number of people, such as programmers or executives, who may be geographically distributed, to monitor in parallel and prevent unwanted content from being broadcast, so long as each has a computer terminal with a standard browser and access to the communications network.

It is recognized that network (and in particular, Internet) latency may be an issue in a system consistent with the invention. With a network connection having a high-enough speed to support streaming audio, there should be a relatively insignificant latency between pressing a "dump" button in a browser page at workstation 106 and effecting the audio dump at the audio gateway 101. However, with streaming audio, it is customary to buffer audio for several seconds to prevent typical Internet packet disruptions from affecting the listening experience. For human interface reasons, it is desirable for streaming audio server 103, and workstation 106 receiving the stream, to be adjusted for minimum latency so as to provide a nearly real-time stream. Ordinarily, there is sufficient delay in the hardware at a broadcast studio to compensate for a few seconds of Internet latency.

In certain embodiments of the present invention, streaming audio server 103 sends one or more precise time codes concomitantly with the audio stream, in which case, workstation 106 has knowledge of the exact time (e.g., by using Network Time Protocol (NTP), which is built into many computer operating systems). In this scenario, an indication of latency can be presented to the remote operator at workstation 106 so that the operator can best judge exactly when to press "dump." In certain hardware configurations, the operator will be able to listen to the input audio feed on a true radio monitor having an effective latency of zero, in which case the operator can monitor both the input and output streams of audio gateway 101, to improve judgment regarding when to press "dump." Of course, this requires that the operator be in range of or otherwise able to hear the broadcast in real time.

Because Internet bandwidth requirements increase with better audio quality, streaming audio server 103 may be capable of running at a slow data rate (e.g., 16 Kbits/sec) to accommodate operators with dial-up or otherwise limited connections.

It is desirable for the operator to be able to hear, in real time, the audio feed currently being broadcast to have first-hand knowledge of the broadcast delay, so that the operator can sense the best moment at which to hit the dump button to achieve the best sound and to eliminate cleanly the undesired material. The output of the broadcast delay is readily available if the operator is close enough to the radio station to be able to hear the broadcast station on an ordinary radio. However, when the operator is monitoring over the Internet and cannot hear the station because it is out of range, or for other reasons, the operator eliminates the undesirable material by pressing "dump" either as soon as it is heard, or more or less by instinct, knowing how much time is left before it reaches the broadcast airwaves. With long data segments in storage, this can result in an interruption of the program flow and deletion of desired material as well.

Accordingly, as mentioned above, in certain embodiments of the present invention, an operator can monitor both the input and output of audio gateway 101, even when the operator is unable to hear the live broadcast. The output can be heard in pseudo-real-time, i.e., without latency affecting the operator's decisions, thereby enabling the operator to effect dumps that are less intrusive with respect to the resulting audio broadcast. In certain embodiments of the invention, "latency feedback" is provided to allow the operator to monitor the output of audio gateway 101, i.e., the material currently being aired, effectively in real time.

Figure 3:
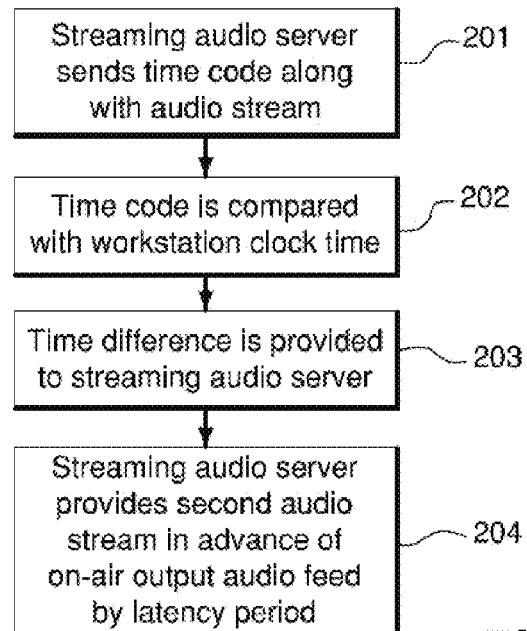
FIG. 3 is a flow diagram illustrating an exemplary method for providing latency feedback in a delay control system consistent with one embodiment of the present invention.

One exemplary method for providing latency feedback is illustrated in the flow diagram of FIG. 3. At block 201, streaming audio server 103 sends, along with the audio stream, one or more precise time codes reflecting the actual (clock) time(s) at which the audio is transmitted. At block 202, when the time code is received at workstation 106, the time code is compared with clock time as determined by workstation 106, e.g., using NTP. At block 203, the resulting time difference between studio time and workstation time, which may be calculated, e.g., by simple subtraction at workstation 106, is returned to streaming audio server 103. The resulting time difference is a reasonably precise measure of the Internet and buffer latency period between the studio and workstation 106 and will typically range from a fraction of a second to several seconds. At block 204, streaming audio server 103 "taps" the delay line of audio gateway 101 at this latency period before the signal to be aired and provides to workstation 106 a second audio stream in advance of the actual, on-air output audio feed of audio gateway 101 by the latency period.

The effect of the foregoing method is that the operator at workstation 106 can listen to and monitor a signal that is contemporaneous with what would be heard listening to a broadcast receiver over the air. Because the reverse latency of pressing the "dump" button should be relatively small, the operator will therefore be able to edit the audio material immediately before it is aired, which is desirable in achieving the best-sounding program.

Because Internet latency can change, the measurement process is desirably a continuous one, and the actual delay "tap" time can vary, as may be necessary. If there is also significant reverse latency and the activation of the "dump" button on the web page takes more than a few milliseconds to register, then that latency can also be measured in a similar fashion as the audio latency, and the sum of the two delays can be used to determine the "tap" location.

It should be recognized that the present invention has utility in a number of applications other than traditional radio broadcasting. For example, real-time corporate securities announcements can be monitored by legal counsel, to prevent executives from saying inappropriate things that might cause problems for the company. Political press conferences and military press briefings can also be monitored to prevent classified or tactical information from being inadvertently divulged.

In addition to controlling audio delays, such as for radio broadcasts, the present invention is also applicable to controlling delays of other signals, such as video signals. In this regard, the term "media" may be used herein with reference to audio, video, and/or a combination of audio and video, and streamed media in a system consistent with the present invention may be encoded and/or decoded using standard algorithms and compressed and/or decompressed using compression schemes, including those implemented in software such as Microsoft's Windows Media Player, Apple's QuickTime™ and RealPlayer™ from ReatNetworks, Inc. of Seattle, Wash.

For example, quarterly conference calls held by many public companies are webcast and may benefit from oversight. In accordance with this aspect of the invention, a delay is introduced in the stream that is being webcast. Simultaneously, the "live" or undelayed audio/video program material is narrowcast. In this scenario, the narrowcast would only be received by authorized individuals (i.e., censors) who can hit the "dump" button from anywhere on the web, using an Internet interface as described above.

An alternative communications network for controlling delay is a cellular telephone network. A button on a cell phone keypad may be used to transmit a signal causing a dump. Alternatively and/or additionally, an audio and/or video stream to be monitored can be transmitted to a hand-held device by the cellular telephone network to enable the operator to make the dump decision.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method for controlling media stream processing, the method comprising:
   (a) transmitting an original media stream, via a first packet-based network, to an operator;
   (b) during the transmission of the original media stream to the operator in step (a), receiving from the operator, via a second packet-based network, a control signal for processing the original media stream;
   (c) during the transmission of the original media stream to the operator in step (a), processing the original media stream based on the control signal; and
   (d) during the transmission of the original media stream to the operator in step (a), transmitting the processed media stream, via a broadcast transmitter, to one or more users other than the operator, wherein:
      the provision of the processed media stream to the one or more users in step (d) occurs in substantially real time relative to the transmission of the original media stream to the operator; and
      the one or more users receive only the processed media stream and not the original media stream transmitted to the operator in step (a).

2. The invention of claim 1, wherein the first packet-based network is the same as the second packet-based network.

3. The invention of claim 1, wherein at least one of the first and second packet-based networks is the Internet.

4. The invention of claim 1, wherein at least one of the first and second packet-based networks is a telephonic network.

5. The invention of claim 1, further comprising transmitting a web page to the operator, the web page containing a control interface permitting the operator to effect transmission of the control signal.

6. The invention of claim 5, wherein at least one of the web page and the transmission of the control signal is encrypted.

7. The invention of claim 1, wherein the processing of the original media stream comprises modifying the content of the original media stream.

8. The invention of claim 1, wherein the processing of the original media stream is performed by a profanity delay device.

9. The invention of claim 1, wherein the transmission of the original media stream via the first network is effected by a streaming media server.

10. The invention of claim 1, further comprising transmitting one or more time codes via the first network concomitantly with the transmission of the original media stream.

11. The invention of claim 10, further comprising determining latency information by comparing one or more of the time codes to a clock time provided by a computer of the operator.

12. The invention of claim 11, further comprising using the latency information to generate and provide another media stream to the operator in advance of the original media stream transmitted in step (a).

13. The invention of claim 11, further comprising determining additional latency information by measuring a latency in at least one of the first packet-based network and the second packet-based network.

14. The invention of claim 13, further comprising using the additional latency information to generate and provide another media stream to the operator in advance of the original media stream transmitted in step (a).

15. The invention of claim 1, wherein the broadcast transmitter is a streaming media server.

16. The invention of claim 1, wherein:
the original media stream is a radio broadcast input feed;
the control signal is generated by a user pressing a control button on a web page;
the processing of the original media stream comprises effecting an audio dump; and
the one or more users comprise a radio broadcast listening audience.

17. The invention of claim 1, wherein the first packet-based network is different from the second packet-based network.

18. Apparatus for controlling media stream processing, the apparatus comprising:
a server adapted to effect transmission of an original media stream, via a first packet-based network, to an operator; and
a processor adapted, during the transmission of the original media stream to the operator:
(i) to effect processing of the original media stream based on a control signal received, during the transmission of the original media stream to the operator, from the operator via a second packet-based network, and
(ii) to provide, during the transmission of the original media stream to the operator, the processed media stream to a transmitter for transmission to one or more users other than the operator, wherein:
the provision of the processed media stream to the transmitter for transmission to the one or more users other than the operator occurs in substantially real time relative to the transmission of the original media stream to the operator; and
the one or more users receive only the processed media stream and not the original media stream transmitted to the operator.

19. The invention of claim 18, wherein the first packet-based network is the same as the second packet-based network.

20. The invention of claim 18, wherein at least one of the first and second packet-based networks is the Internet.

21. The invention of claim 18, wherein at least one of the first and second packet-based networks is a telephonic network.

22. The invention of claim 18, further comprising a web server adapted to transmit a web page to the operator, the web page containing a control interface permitting the operator to effect transmission of the control signal.

23. The invention of claim 22, wherein at least one of the web page and the transmission of the control signal is encrypted.

24. The invention of claim 18, wherein the processing of the original media stream comprises modifying the content of the original media stream.

25. The invention of claim 18, further comprising a profanity delay device adapted to process the original media stream.

26. The invention of claim 18, further comprising a streaming media server adapted to transmit the original media stream via the first network.

27. The invention of claim 18, wherein one or more time codes are transmitted via the first network concomitantly with the transmission of the original media stream.

28. The invention of claim 27, wherein latency information is determined by comparing one or more of the time codes to a clock time provided by a computer of the operator.

29. The invention of claim 28, wherein the latency information is used to generate and provide another media stream to the operator in advance of the original media stream transmitted by the server.

30. The invention of claim 28, wherein additional latency information is determined by measuring a latency in at least one of the first packet-based network and the second packet-based network.

31. The invention of claim 30, wherein the additional latency information is used to generate and provide another media stream to the operator in advance of the original media stream transmitted by the server.

32. The invention of claim 18, further comprising a streaming media server effecting the transmission of the processed media stream to the one or more users other than the operator.

33. The invention of claim 18, wherein:
the original media stream is a radio broadcast input feed;
the control signal is generated by a user pressing a control button on a web page;
the processing of the original media stream comprises effecting an audio dump; and
the one or more users comprise a radio broadcast listening audience.

34. The invention of claim 18, further comprising a computer adapted to permit the operator to generate the control signal via the second packet-based network.

35. The invention of claim 18, wherein the first packet-based network is different from the second packet-based network.

36. A system for controlling media stream processing, the system comprising:
means for transmitting an original media stream, via a first packet-based network, to an operator;
means for effecting, during the transmission of the original media stream to the operator, processing of the original media stream based on a control signal received, during the transmission of the original media stream to the operator, from the operator via a second packet-based network; and
means for providing, during the transmission of the original media stream to the operator, the processed media stream to a transmitter for transmission to one or more users other than the operator, wherein:
the provision of the processed media stream to the transmitter for transmission to the one or more users other than the operator occurs in substantially real time relative to the transmission of the original media stream to the operator; and
the one or more users receive only the processed media stream and not the original media stream transmitted to the operator.

37. The invention of claim 36, wherein the first packet-based network is different from the second packet-based network.

* * * * *